United States Patent
Smoke et al.

(10) Patent No.: US 10,036,254 B2
(45) Date of Patent: Jul. 31, 2018

(54) DUAL ALLOY BLADED ROTORS SUITABLE FOR USAGE IN GAS TURBINE ENGINES AND METHODS FOR THE MANUFACTURE THEREOF

(71) Applicant: HONEYWELL INTERNATIONAL INC., Morris Plains, NJ (US)

(72) Inventors: Jason Smoke, Phoenix, AZ (US); David K. Jan, Fountain Hills, AZ (US); Don Mittendorf, Mesa, AZ (US); Brent Ludwig, Scottsdale, AZ (US); Amandine Miner, Tempe, AZ (US); Deanna Pinar Chase, Tempe, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 286 days.

(21) Appl. No.: 14/939,360

(22) Filed: Nov. 12, 2015

(65) Prior Publication Data
US 2017/0138206 A1     May 18, 2017

(51) Int. Cl.
*B23K 20/02*     (2006.01)
*F01D 5/30*     (2006.01)
(Continued)

(52) U.S. Cl.
CPC ............... *F01D 5/048* (2013.01); *F01D 5/28* (2013.01); *F01D 5/3061* (2013.01); *F01D 5/34* (2013.01);
(Continued)

(58) Field of Classification Search
None
See application file for complete search history.

(56) References Cited

U.S. PATENT DOCUMENTS

| 2,384,919 A | 9/1945 | Huber |
| 2,392,281 A | 1/1946 | Allen |

(Continued)

FOREIGN PATENT DOCUMENTS

| DE | 2130128 A1 | 12/1972 |
| DE | 102009048632 A1 | 4/2001 |

(Continued)

OTHER PUBLICATIONS

Blumer, E. et al.; Bladed Gas Turbine Engine Rotors Having Deposited Transition Rings and Methods for the Manufacture Thereof; U.S. Appl. No. 14/701,262, filed Apr. 30, 2015.
(Continued)

*Primary Examiner* — Devang R Patel
(74) *Attorney, Agent, or Firm* — Lorenz & Kopf, LLP (57) ABSTRACT

Dual alloy bladed rotors are provided, as are methods for manufacturing dual alloy bladed rotors. In one embodiment, the method includes arranging bladed pieces in a ring formation such that contiguous bladed pieces contact along shank-to-shank bonding interfaces. The ring formation is positioned around a hub disk, which is contacted by the bladed pieces along a shank-to-hub bonding interface. A metallic sealing material is deposited between contiguous bladed pieces utilizing, for example, a laser welding process to produce an annular seal around the ring formation. A hermetic cavity is then formed, which is circumferentially bounded by the annular seal and which encloses the shank-to-shank and shank-to-hub bonding interface. Afterwards, a Hot Isostatic Pressing process is performed during which the ring formation and the hub disk are exposed to elevated pressures external to the hermetic cavity sufficient to diffusion bond the shank-to-shank and shank-to-hub bonding interface.

13 Claims, 9 Drawing Sheets

(51) Int. Cl.
*F01D 5/04* (2006.01)
*F01D 5/28* (2006.01)
*F01D 5/34* (2006.01)
*B23K 101/00* (2006.01)

(52) U.S. Cl.
CPC ...... *B23K 20/021* (2013.01); *B23K 2201/001* (2013.01); *F05D 2230/42* (2013.01); *F05D 2300/175* (2013.01); *F05D 2300/607* (2013.01); *F05D 2300/609* (2013.01)

(56) References Cited

U.S. PATENT DOCUMENTS

| | | | |
|---|---|---|---|
| 2,423,165 | A | 7/1947 | Allen |
| 2,450,493 | A | 10/1948 | Strub |
| 2,454,580 | A | 11/1948 | Thielemann |
| 3,246,389 | A | 4/1966 | Hans |
| 3,292,245 | A | 12/1966 | Hans |
| 3,590,454 | A | 7/1971 | Brass |
| 3,692,501 | A | 9/1972 | Hoppin et al. |
| 3,928,029 | A | 12/1975 | Fisk |
| 4,096,615 | A | 6/1978 | Cross |
| 4,152,816 | A | 5/1979 | Ewing et al. |
| 4,270,256 | A | 6/1981 | Ewing |
| 4,494,287 | A | 1/1985 | Cruzen et al. |
| 4,529,452 | A | 7/1985 | Walkar |
| 4,538,331 | A | 9/1985 | Egan et al. |
| 4,573,876 | A | 3/1986 | Egan et al. |
| 4,581,300 | A | 4/1986 | Hoppin, III et al. |
| 4,592,120 | A | 6/1986 | Egan et al. |
| 4,659,288 | A | 4/1987 | Clark et al. |
| 4,671,448 | A | 6/1987 | Million et al. |
| 4,710,103 | A | 12/1987 | Faber et al. |
| 4,782,206 | A | 11/1988 | Ayres et al. |
| 4,812,107 | A | 3/1989 | Barcella et al. |
| 4,864,706 | A | 9/1989 | Jenkel |
| 4,907,947 | A | 3/1990 | Hoppin, III |
| 5,061,154 | A | 10/1991 | Kington |
| 5,106,012 | A | 4/1992 | Hyzak et al. |
| 5,113,583 | A | 5/1992 | Jenkel et al. |
| 5,273,708 | A | 12/1993 | Freeman |
| 5,390,413 | A | 2/1995 | Pratt |
| 6,098,871 | A | 8/2000 | Cairo et al. |
| 6,118,098 | A | 9/2000 | Amos |
| 6,274,839 | B1 | 8/2001 | Stone et al. |
| 6,326,585 | B1 | 12/2001 | Aleshin |
| 6,709,771 | B2 | 3/2004 | Allister |
| 6,814,544 | B2 | 11/2004 | Tsukamoto et al. |
| 6,969,238 | B2 | 11/2005 | Groh et al. |
| 7,316,057 | B2 | 1/2008 | Seth |
| 7,438,530 | B2 | 10/2008 | Ferte et al. |
| 7,560,065 | B2 | 7/2009 | Troitski et al. |
| 7,634,854 | B2 | 12/2009 | Meier |
| 7,722,330 | B2 | 5/2010 | Seth |
| 7,766,623 | B2 | 8/2010 | Chou et al. |
| 7,832,986 | B2 | 11/2010 | Baker et al. |
| 7,967,924 | B2 | 6/2011 | Groh et al. |
| 8,043,068 | B2 | 10/2011 | Imano et al. |
| 8,220,697 | B2 | 7/2012 | Kottilingam et al. |
| 8,266,800 | B2 | 9/2012 | Segletes et al. |
| 8,356,980 | B2 | 1/2013 | Izadi |
| 8,360,302 | B2 | 1/2013 | Richter |
| 8,408,446 | B1 | 4/2013 | Smoke et al. |
| 8,496,443 | B2 | 7/2013 | Campbell et al. |
| 8,506,836 | B2 | 8/2013 | Szuromi et al. |
| 8,631,577 | B2 | 1/2014 | Ing |
| 8,662,851 | B2 | 3/2014 | Izadi |
| 8,668,442 | B2 | 3/2014 | Morris et al. |
| 8,801,338 | B2 | 8/2014 | Ortiz |
| 8,961,132 | B2 | 2/2015 | Suciu et al. |
| 9,033,670 | B2 | 5/2015 | Mittendorf et al. |
| 9,724,780 | B2 | 8/2017 | Miner et al. |
| 2003/0189028 | A1 | 10/2003 | Wright et al. |
| 2006/0166020 | A1 | 7/2006 | Raybould et al. |
| 2006/0239825 | A1 | 10/2006 | Rice et al. |
| 2006/0260126 | A1 | 11/2006 | Groh et al. |
| 2008/0107531 | A1 | 5/2008 | Chou et al. |
| 2009/0068016 | A1 | 3/2009 | Perron et al. |
| 2009/0119919 | A1 | 5/2009 | Kington et al. |
| 2009/0162205 | A1 | 6/2009 | Strangman et al. |
| 2010/0193480 | A1 | 8/2010 | Adams |
| 2010/0284817 | A1 | 11/2010 | Bamberg et al. |
| 2011/0176922 | A1 | 7/2011 | Schmidt |
| 2014/0093384 | A1 | 4/2014 | Mironets et al. |
| 2014/0124483 | A1 | 5/2014 | Henn |
| 2014/0130353 | A1 | 5/2014 | Kington et al. |
| 2014/0314581 | A1 | 10/2014 | McBrien et al. |
| 2015/0118048 | A1 | 4/2015 | Kington et al. |
| 2015/0144496 | A1 | 5/2015 | Morris et al. |

FOREIGN PATENT DOCUMENTS

| | | |
|---|---|---|
| EP | 2626169 A2 | 2/2013 |
| EP | 2650474 A2 | 10/2013 |
| EP | 2865482 A1 | 4/2015 |
| EP | 3000556 A1 | 9/2015 |
| EP | 2952687 A2 | 12/2015 |

OTHER PUBLICATIONS

Smoke, J. et al.; Dual Alloy Gas Turbine Engine Rotors and Methods for the Manufacture Thereof; U.S. Appl. No. 14/823,787, filed Aug. 11, 2015.

Hoppin; Manufacturing Processes for Long-Life Gas Turbines; abstract available online at http://link.springer.com; Jul. 1986, vol. 30, Issue 7, pp. 20-23.

Yang, J. et al.; HIP diffusion bonding of FGH96-DD6 dual alloys; available online at http://www.maneyonline.com; vol. 18, Issue S4, (Jul. 2014), pp. S4-429-S4-434.

Additive Manufacturing; Oct. 7, 2013; http://airinsight.com/2013/10/07/additive-manufacturing/#.

Additive Manufacturing 3D Printing; http://www.sciaky.com/additive_manufacturing.html; 2014 Sciaky, Inc. A Subsidiary of Phillips Service Industries, Inc.—All Rights Reserved.

Extended EP Search Report for Application No. 16166284.6-1373 dated Aug. 5, 2016.

Extended EP Search Report for Application No. 16182276.2-1709 dated Oct. 31, 2016.

EP Examination Report for Application No. 16166284.6-1373 dated Jun. 13, 2017.

USPTO Office Action for U.S. Appl. No. 14/701,262 dated Aug. 1, 2017.

USPTO Office Action for U.S. Appl. No. 14/823,787 dated Oct. 5, 2017.

USPTO Notice of Allowance for U.S. Appl. No. 14/701,262 dated Dec. 6, 2017.

Extended EP Search Report for Application No. 16196480.4-1702 dated Jun. 14, 2017.

USPTO Office Action for U.S. Appl. No. 14/823,787 dated May 16, 2018.

DUAL ALLOY BLADED ROTORS SUITABLE FOR USAGE IN GAS TURBINE ENGINES AND METHODS FOR THE MANUFACTURE THEREOF

TECHNICAL FIELD

The present invention relates generally to bladed rotors well suited for usage in gas turbine engines and, more particularly, to dual alloy bladed rotors and methods for the production thereof.

BACKGROUND

A Gas Turbine Engine (GTE) can contain various different combinations of bladed rotors, such as axial compressor, radial or centrifugal compressor, axial turbine, radial-inflow turbine, and fan rotors. The thermal and mechanical demands placed on a particular bladed rotor can vary significantly across the rotor during GTE operation. Generally, the rotor blades are bathed in core gas flow and thus exposed to high temperature, chemically-harsh (e.g., corrosive and oxidative) environments. In contrast, the inner "hub disk" portion of the rotor is largely shielded from core gas flow, but may be subject to considerable mechanical stress resulting from the centrifugal forces acting on the rotor at high rotational speeds. Performance benefits can consequently be realized by fabricating the hub disk and rotor blades from different alloys tailored to their specific operating environments. For example, a so-called "inserted blade rotor" can be produced by attaching a number of bladed pieces composed of a first superalloy to a separately-fabricated rotor hub composed of a different superalloy. The bladed pieces are fabricated to include shanks, which are inserted into mating slots provided around the periphery of the hub disk. The shanks and mating slots are formed to have an interlocking geometry, such as a fir tree or dove tail interface, to prevent disengagement of the bladed pieces in a radial direction during high speed rotation of the rotor.

While enabling the production of a bladed rotor having a hub disk and bladed pieces fabricated from different alloys, the above-described inserted blade manufacturing approach is limited in certain respects. The formation of geometrically complex mating interfaces between the blade shanks and the hub disk can require multiple precision machining steps, which add undesired cost, duration, and complexity to the rotor manufacturing process. As a further drawback, the mating shank-disk interfaces can be difficult to seal. If not fully sealed, such interfaces can permit undesired leakage across the bladed rotor and trap debris increasing the propensity of the rotor to corrode. As a still further drawback, the formation of the mating shank-disk interfaces may necessitate an increase in the overall size and weight of the bladed rotor to achieve a structural integrity comparable to that of a monolithic or single piece bladed rotor. More recently, manufacturing approaches have been developed in which a full blade ring and a hub disk are separately produced from different superalloys and then metallurgically consolidated to produce a so-called "dual alloy bladed rotor." As conventionally proposed and implemented, however, such approaches for manufacturing dual alloy bladed rotors remain limited in certain respects; e.g., such manufacturing approaches may prevent or render impractical the usage of single crystal and directionally-solidified superalloy in producing the rotor blades.

It is thus desirable to provide methods for manufacturing a dual alloy bladed rotor that overcome one or more of the above-described limitations. For example, it is desirable to provide methods for manufacturing dual alloy bladed rotors that reduce leakage across the bladed rotor, that minimize the overall size and weight of the bladed rotor, and that are generally less complex and costly to perform relative to other known rotor manufacturing approaches. Ideally, embodiments of such a manufacturing process would further enable fabrication of the rotor blades from a wide variety of high temperature materials including single crystal and directionally-solidified superalloys. It would also be desirable to provide embodiments of a dual alloy bladed rotor produced utilizing such a manufacturing process. Other desirable features and characteristics of embodiments of the present invention will become apparent from the subsequent Detailed Description and the appended Claims, taken in conjunction with the accompanying drawings and the foregoing Background.

BRIEF SUMMARY

Methods for manufacturing dual alloy bladed rotors are provided. In one embodiment, the method includes arranging bladed pieces in a ring formation such that contiguous bladed pieces contact along shank-to-shank bonding interfaces. The blade pieces may or may not be cooled bladed pieces including internal channels, slots, or other cooling features. The ring formation is positioned around a hub disk, which is contacted by the bladed pieces along a shank-to-hub bonding interface. A metallic sealing material, such as an alloy or an essentially pure metal, is deposited between contiguous bladed pieces to produce an annular seal around the ring formation. The metallic sealing material is usefully deposited utilizing a localized, fusion-based deposition process, such as a computer controlled laser or electron beam welding process. A hermetic cavity is then formed, which is circumferentially bounded by the annular seal and which encloses the shank-to-shank and shank-to-hub bonding interface. Afterwards, a Hot Isostatic Pressing (HIP) process is performed during which the ring formation and the hub disk are exposed to elevated temperatures and pressures external to the hermetic cavity sufficient to bond the shank-to-shank and shank-to-hub bonding interface.

In another embodiment of the manufacturing process, bladed pieces are arranged in a ring formation such that flow path junctures are formed between contiguous bladed pieces extending across an outer circumferential surface of the ring formation. A metallic sealing material is deposited along the flow path junctures to form a hermetic annular seal around the outer circumferential surface of the ring formation. A HIP process is then performed to diffusion bond contiguous bladed pieces in the ring formation and yield a metallurgically-consolidated blade ring. During the HIP process, the ring formation is heated to elevated temperatures, while a pressure differential is created across the hermetic annular seal sufficient to induce the desired diffusion bonding. In certain implementations wherein the bladed pieces are cast from a blade alloy, such as a single crystal or directionally-solidified superalloy, the method can further include positioning the ring formation around a hub disk composed of a superalloy different than the blade alloy. In such implementations, the hub disk is usefully diffusion bonded to the metallurgically-consolidated blade ring in parallel with diffusion bonding of the contiguous bladed pieces.

Dual alloy bladed rotors suitable for usage within gas turbine engines are further provided. In one embodiment, the dual alloy bladed rotor includes a hub disk composed of a hub disk alloy and diffusion bonded to a metallurgically-consolidated blade ring. The metallurgically-consolidated blade ring is comprised of a plurality of bladed pieces diffusion bonded at shank-to-shank bonding interfaces. The plurality of bladed pieces are each fabricated from a blade alloy different than the hub disk alloy. In certain implementations wherein the blade alloy is a single crystal or directionally-solidified superalloy, the dual alloy bladed rotor may further include grain boundary strengthening layers provided at the shank-to-shank bonding interfaces. In other implementations, the metallurgically-consolidated blade ring further includes flow path junctures between adjacent ones of the plurality of bladed pieces, as well as flow path joints formed along the flow path junctures and composed of a metallic sealing material having a ductility greater than that of the blade alloy. In such implementations, the metallurgically-consolidated blade ring may still further include open trenches, which extend along the flow path joints and which are substantially filled with the metallic sealing material.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description.

The following describes embodiments of a method for manufacturing a dual alloy bladed rotor, which is well-suited for usage within gas turbine engines and other turbomachines. The dual alloy bladed rotor can be produced utilizing a hub disk and a number of bladed pieces, which are cast or otherwise produced from a blade alloy. During manufacture, the bladed pieces are arranged in a ring formation, and a metallic sealing material, such as an alloy or an essentially pure metal, is deposited between contiguous bladed pieces to produce an outer circumferential seal around the ring formation. The metallic sealing material is advantageously deposited utilizing a computer-controlled localized fusion deposition process, such as a laser or electron beam welding process, to limit the heat input to the rotor blades and better preserve blade alloy strength. A Hot Isostatic Pressing (HIP) process is then carried-out to diffusion bond the bladed pieces along their mating interfaces and produce a metallurgically-consolidated blade ring in an embodiment. During the HIP process, the bladed pieces are also usefully diffusion bonded to the hub disk, which is fabricated from a hub disk alloy different than the blade alloy. Final processing steps, such as detailed machining and the application of coatings or coating systems, may then be performed to complete the bladed rotor. By virtue of such a manufacturing process, the hub disk can be fabricated from a first alloy (e.g., an equiax superalloy) having relatively high mechanical strength at operational temperatures, while the rotor blades are produced from a second alloy (e.g., a single crystal or directionally-solidified superalloy) providing good mechanical strength and oxidation resistance under high temperature conditions. The temperature capabilities and performance characteristics of the dual alloy bladed rotor can be optimized as a result. Additional benefits are also achieved utilizing such a manufacturing process, as will become apparent from the following description.

An exemplary process for manufacturing a dual alloy bladed rotor will now be described in conjunction with FIGS. 1-10. For purposes of explanation, the following describes the exemplary manufacturing process in conjunction with the manufacture of a particular type of bladed rotor; specifically, a radial turbine rotor shown at various stages of completion in FIGS. 2-10. As a point of emphasis, the following description is provided by way of non-limiting example only. In further embodiments, the below-described manufacturing process can be utilized to produce various other types of bladed rotors including a plurality of blades or airfoils bonded (e.g., metallurgically consolidated) into a blade ring, which can be, but is not necessarily diffusion bonded to an inner body or hub disk. A non-exhaustive list of other rotors that can be produced utilizing embodiments of the below-described manufacturing process include other types of radial turbine rotors, axial turbine rotors, axial compressor rotors, radial or centrifugal compressor rotors (also referred to as "impellers"), and fan rotors. More generally, the dual alloy bladed rotors described herein can be utilized within any type of gas turbine engine or turbomachine, regardless of application or design.

Figure 1:
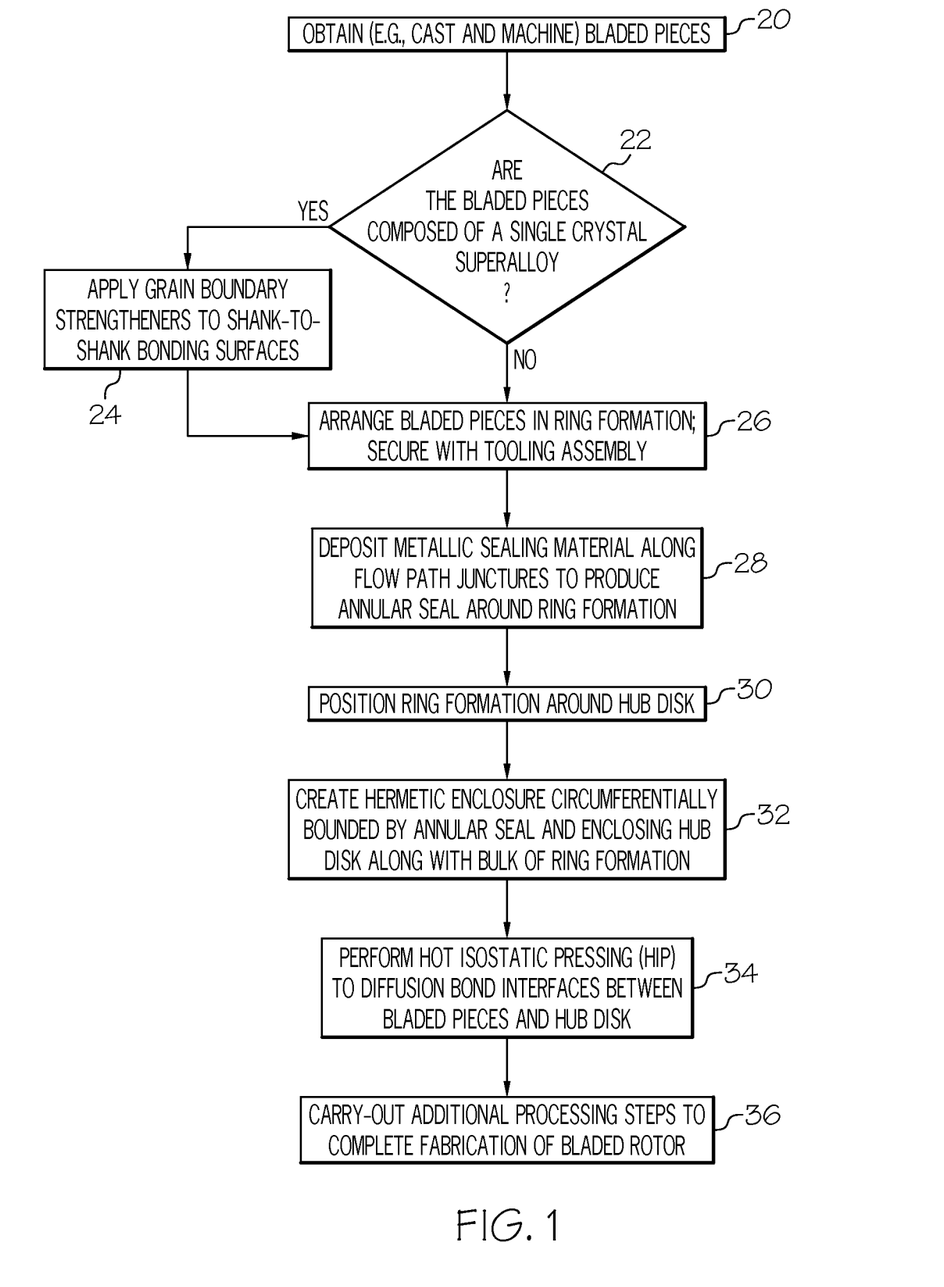
FIG. 1 is a flowchart setting-forth an exemplary method for manufacturing a dual alloy bladed rotor, as illustrated in accordance with an exemplary embodiment of the present invention.

FIG. 1 is a flowchart setting-forth an exemplary method 18 for manufacturing a dual alloy bladed rotor, such as a turbine or compressor wheel, as illustrated in accordance with an exemplary embodiment of the present invention. In the exemplary embodiment shown in FIG. 1, method 18 includes a number of STEPS 20, 22, 24, 26, 28, 30, 32, 34, and 36, as described sequentially below. Depending upon the particular manner in which method 18 is implemented, each step generically illustrated in FIG. 1 may entail a single process or multiple individual sub-processes. Furthermore, the steps illustrated in FIG. 1 and described below are provided by way of non-limiting example only. In alternative embodiments of method 18, additional steps may be performed, certain steps may be omitted, and/or the illustrated steps may be performed in alternative sequences.

Exemplary method 18 commences with obtaining a number of bladed pieces (STEP 20, FIG. 1). The bladed pieces can be independently produced, purchased from a supplier, or otherwise obtained during STEP 20. The bladed pieces can be produced utilizing any one of a number of different manufacturing techniques and from various different materials. For example, the bladed pieces can be individually cast from a superalloy having a relatively high mechanical strength under high temperature conditions. Machining can be performed post-casting, if needed. In one embodiment, each bladed piece is cast or otherwise produced from a single crystal or directionally-solidified superalloy having its crystallographic grain structure oriented to provide optimal mechanical strength in a radial direction. A creep-resistant, single crystal, nickel-based superalloy may be utilized, such as the nickel-based superalloys commercially identified as "CMSX 3," "CMSX 4," "SC180," and "1484," to list but a few examples. In further embodiments, the bladed pieces can be produced in other manners and fabricated from other high temperature materials, such as equi-axed superalloys.

The initial fabrication of a plurality of discrete bladed pieces provides several advantages as compared to the production of full blade ring. By initially casting or otherwise producing individual bladed pieces, any defective or unusable pieces can be identified prior to integration into the metallurgically-consolidated or diffusion bonded blade ring. This allows a reduction in scrap volume and cost as compared to a single shot casting process wherein any voiding, occlusions, or other defects may require rejection of the entire ring casting. The casting process can typically be more reliably and precisely controlled for smaller volume pieces. Casting individual bladed pieces thus generally provides higher yields due to more reliable filling of the individual bladed pieces. Additionally, individual bladed pieces can facilitate the production of bladed pieces having relatively complex external and internal features, such as internal cooling passages and heat transfer enhancement features. Furthermore, as indicated above, casting of individual bladed pieces facilitates production of the blade pieces from a wide variety of superalloys including directionally-solidified and single crystal superalloys.

Figure 2:
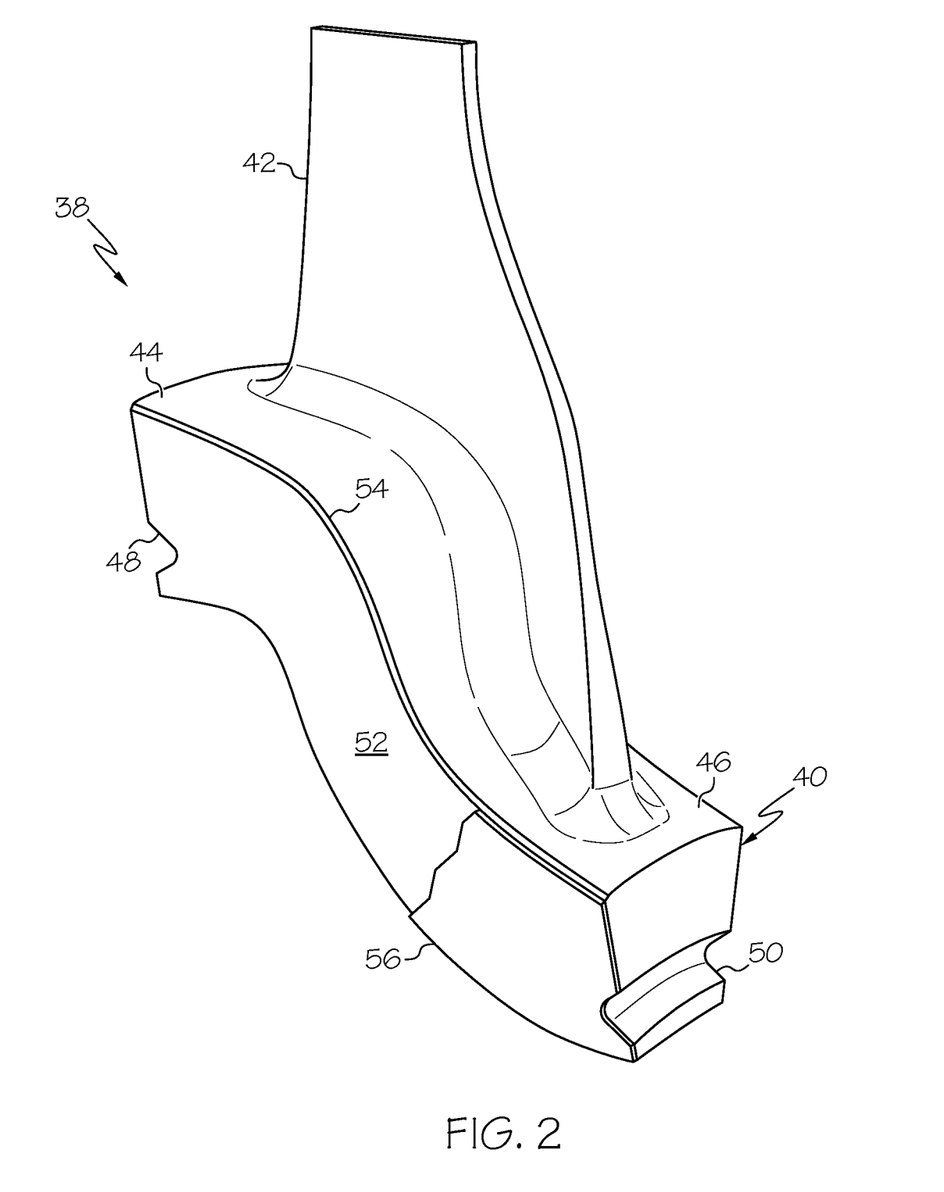
FIG. 2 is an isometric view of a bladed piece that may be independently produced or otherwise obtained along with a number of like bladed pieces during the exemplary manufacturing process of FIG. 1.

FIG. 2 is an isometric view of an exemplary bladed piece 38 that may be obtained during STEP 20 of method 18 (FIG. 1) along with a number of similar bladed pieces (not shown). Bladed piece 38 includes a wedge-shaped body or shank 40 from which an airfoil or blade 42 extends. In this example, shank 40 has been cast or otherwise fabricated to include an outer sacrificial portion that envelops or encompasses the desired shape of the completed shank. Stated differently, shank 40 is a rough casting or preform physically embodying the finished shank, which may later be defined by further machining as described below in conjunction with FIGS. 7 and 10. Shank 40 includes shoulders 44 and 46, which extend from the central body of shank 40 in opposing axial directions. Tooling contact features 48 and 50 are formed in the opposing fore-aft faces of shoulders 44 and 46, respectively; that is, the faces of shoulders 44 and 46 facing in opposing directions along the fore-aft axis of bladed piece 38. In this example, tooling contact features 48 and 50 each comprise an arced segment of an annular groove, which has a wedge-shaped cross-sectional geometry. The annular groove is fully formed when bladed piece 38 and a number of like bladed pieces are arranged in a ring formation or annular grouping, as described more fully below in conjunction with FIGS. 3 and 4.

Shank 40 further includes opposing lateral faces or sidewall surfaces 52, only one of which can be seen in FIG. 2. Sidewall surfaces 52 are each angled to impart shank 40 with a wedge-shaped geometry, when viewed from the forward/leading or aft/trailing end thereof. Outer longitudinal-extending edges 54 of shank 40 are usefully imparted with a beveled or chamfered geometry. In embodiments wherein bladed piece 38 is cast, chamfered edges 54 can be produced during the initial casting process or, instead, formed post-casting utilizing a machining process. By producing bladed piece 38 and other non-illustrated bladed pieces to include chamfered longitudinal edges 54, elongated recesses are created along outer edges of the junctions between the bladed pieces when arranged in the ring formation described below in conjunction with FIGS. 3 and 4. The recesses can cooperate to form open trenches, which extend along the shank-to-shank junctions and increase the surface area available for bonding with the fusion-deposited metallic sealing material. In further embodiments, the geometry and structure of bladed piece 38 can vary; e.g., the bladed pieces may lack chamfered edges 54 and/or each bladed piece can include two or more blades. Additionally, in certain embodiments, bladed piece 38 can lack blades at the present stage of manufacture and instead include features (e.g., one or more slots having dovetail or fir tree geometries) to which one or more blades are subsequently attached. As a still further possibility, bladed piece 38 can include only a portion of one or more blades, and the remaining portion of the blade (e.g., the blade tip) can subsequently be produced utilizing an additive metal deposition process, such as a three dimensional (3D) metal printing process.

As indicated in FIG. 1 at STEP 24, it may be desirable to apply a grain boundary strengthening layer to one or both of sidewall surfaces 52 when bladed piece 38 and the other non-illustrated bladed pieces are produced from a single crystal superalloy In such implementations, the provision of a grain boundary strengthening layer between adjacent bladed pieces can help ease the transition between the boundaries of the disparately-orientated crystalline structures of neighboring bladed pieces. The grain boundary strengthening layer can have any composition suitable for this purpose and can be applied to one or both of sidewall surfaces 52 utilizing various different deposition techniques. In one embodiment, the grain boundary strengthening layer can contain one or more metallic elements, such as iridium, tantalum, and yttrium; and may be plated onto sidewall surfaces 52 of bladed piece 38 (FIG. 2) and the other non-illustrated bladed pieces. This notwithstanding, the application of grain boundary strengtheners to sidewall surfaces 52 may be unwarranted in further embodiments, even when the bladed pieces are fabricated from a single crystal or directionally-solidified superalloy, as the boundary angle between the crystalline structures of the adjacent bladed pieces will often be relatively low.

Figure 3:
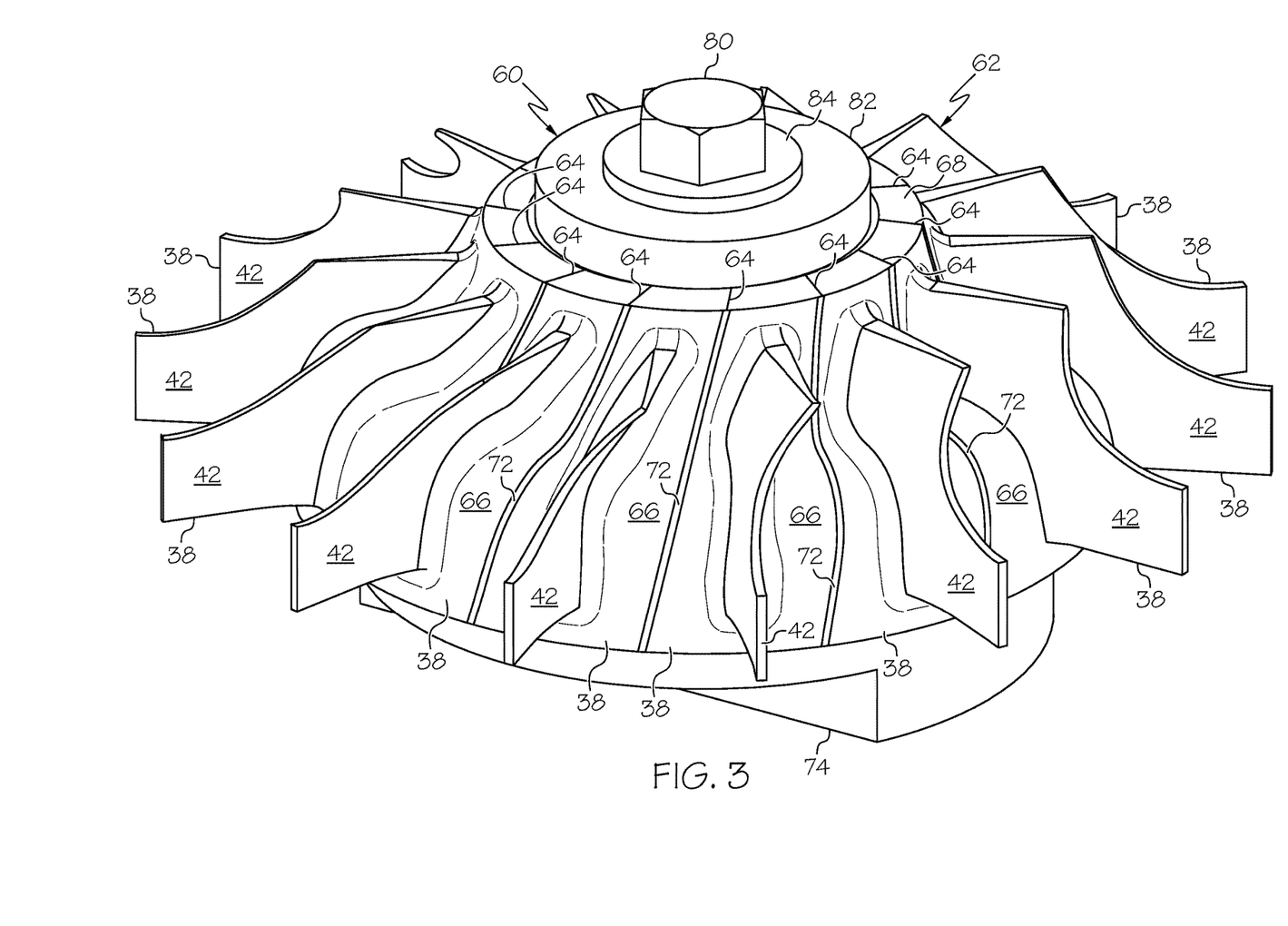
FIGS. 3 and 4 are isometric and cross-sectional views, respectively, of a tooling assembly maintaining the bladed piece shown in FIG. 2 and a number of similar bladed pieces in a ring formation for further processing.
Figure 4:
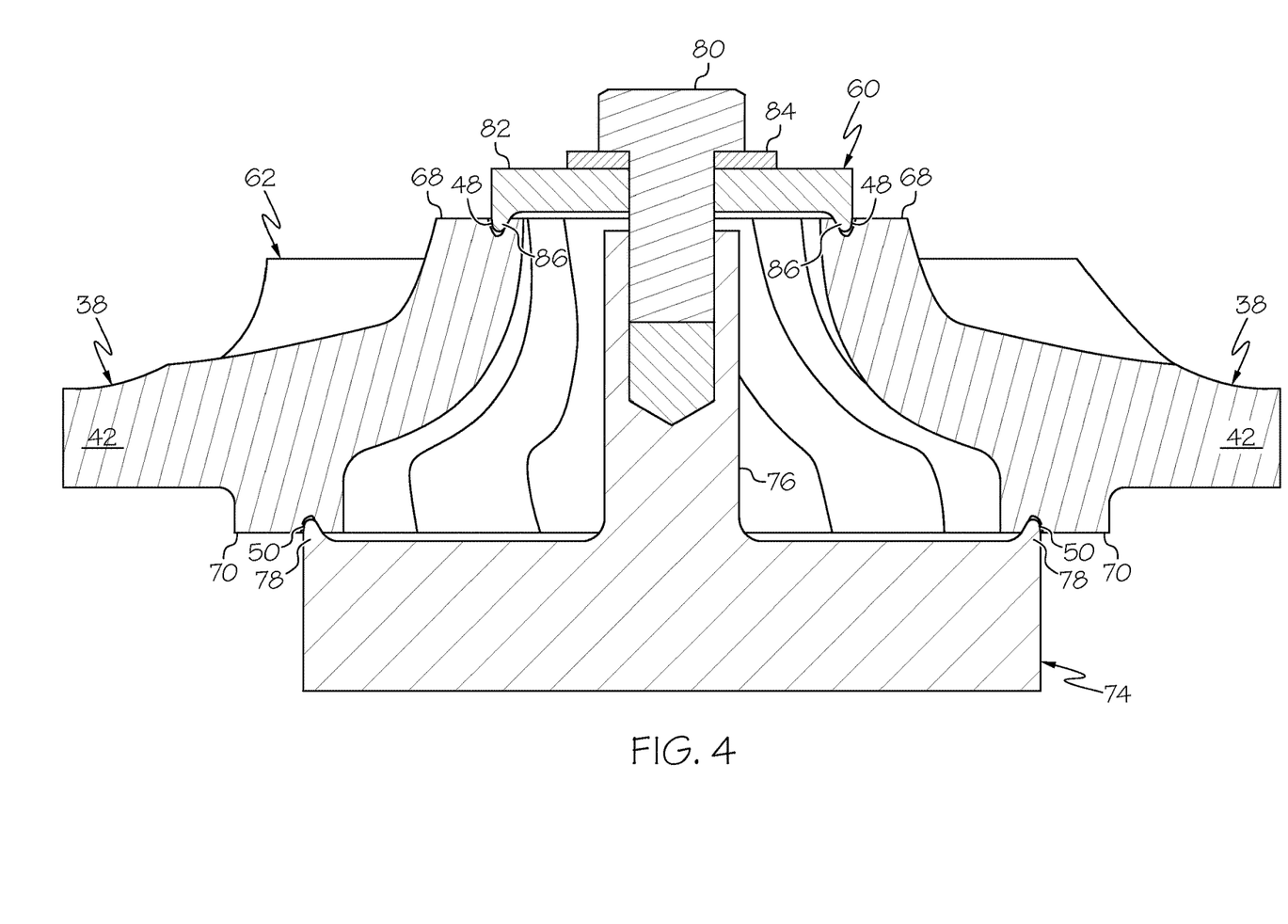

Exemplary method 18 continues with arranging the bladed pieces in an annular grouping or ring formation (STEP 26, FIG. 1). The bladed pieces may be loaded into a specialized tooling assembly, which maintains the bladed pieces in the ring formation during subsequent processing steps. FIGS. 3 and 4 are isometric and cross-sectional views, respectively, of an exemplary tooling assembly 60 suitable for maintaining a plurality of a bladed pieces 38 in a ring formation 62. Each bladed piece 38 shown in FIGS. 3 and 4 is substantially identical to the bladed piece 38 shown in FIG. 2; thus, like numbering has been utilized to identify selected features of each bladed piece 38. When arranged into ring formation 62, the wedge-shaped shanks of bladed pieces 38 contact to form a full ring or a continuous, 360 degree hoop. Shank-to-shank bonding interfaces 64 are formed by the contacting surfaces of adjacent bladed pieces 38, which may include sidewall surfaces 52 or any intervening layers (e.g., layers 56) formed therebetween. Shank-to-shank bonding interfaces 64 remain unbonded at the present juncture of manufacture, but are subsequently diffusion bonded to metallurgically consolidate bladed pieces 38 into a single piece or monolithic bladed ring, as described more fully below in conjunction with STEP 34 of method 18 (FIG. 1).

When arranged into ring formation 62 shown in FIGS. 3-4, bladed pieces 38 cooperate to define a number of gas flow paths 66, which are spaced around the outer circumference of ring formation 62 and interspersed with blades 42. Gas flow paths 66 extend substantially across the outer surface of ring formation 62 in fore-aft directions. More specifically, each flow path 66 extends from a point adjacent the larger diameter forward face 70 of ring formation 62 (shown in FIG. 4), axially across the body of ring formation 62, and to the smaller diameter aft face 68 of ring formation 62. The interfaces or junctures between contiguous bladed pieces 38 exposed along outer flow paths 66 are referred to herein as "flow path junctures" and identified in FIG. 3 by reference numerals "72." In implementations wherein bladed pieces 38 are imparted with chamfered edges 54 (FIG. 2), chamfered edges 54 of contiguous bladed pieces 38 combine to form wedge-shaped channels or open trenches extending along flow path junctures 72. The open trenches may subsequently be filled with a selected metallic sealing material during the below-described fusion deposition process. In other embodiments, bladed pieces 38 may lack chamfered edges 54 such that open trenches are not formed along flow path junctures 72.

Tooling assembly 60 can have any form and include any number of components suitable for temporarily retaining bladed pieces 38 in ring formation 62 during the below-described sealing material deposition process. In the illustrated example, and as shown most clearly in FIG. 4, tooling assembly 60 includes a base piece 74 and a post or stem 76, which extends from base piece 74 upwardly into the central opening of ring formation 62. A lower annular lip 78 is provided around the outer circumferential edge of base piece 74. Lower annular lip 78 has a wedge-shaped cross-sectional geometry and engages the annular groove formed by tooling contact features 50 when bladed pieces 38 are arranged in ring formation 62 and loaded into tooling assembly 60. A bolt 80 is threaded into an opening provided in the upper end of stem 76. When tightened, bolt 80 captures a clamp ring 82 and a washer 84 against axial face 68 of ring formation 62. An upper annular lip 86 is further provided around the lower peripheral edge of clamp ring 82 and engages the annular groove formed in ring formation 62 by tooling contact features 48. As bolt 80 is tightened, a clamping force is exerted across ring formation 62. Due to the conical or wedge-shaped geometry of tooling contact features 48 and 50, lower annular lip 78, and upper annular lip 86, this clamping force is exerted in axial and radially inward directions to maintain the bladed pieces 38 in an arch bound state for further processing. In this manner, tooling assembly 60 retains bladed pieces 38 in their desired positions within ring formation 62 in a secure manner. At the same time, tooling assembly 60 provides physical and visual access to the outer circumference of ring formation 62 and flow path junctures 72 along which a metallic sealing material is subsequently deposited.

Advancing to STEP 28 of exemplary method 18 (FIG. 1), a metallic sealing material is next deposited between contiguous bladed pieces 38 and along flow path junctures 72 to produce an annular seal around the outer circumference of ring formation 62. Deposition of the metallic sealing material is advantageously carried-out utilizing a localized fusion deposition process of the type which enables precise computer control of the thermal input to the bladed pieces. Suitable localized fusion deposition processes include, but are not limited to, Ion Fusion Formation (IFF), pulsed-arc Metal Inert Gas (MIG) welding, and other additive metal manufacturing processes. Laser welding or electron beam welding processes may be especially useful in deposition of the metallic sealing material as such processes are capable of depositing a relatively thin bead of metallic sealing material in an efficient manner and utilizing a highly focused, controlled heat source (the laser or electron beam). This, in turn, allows the heat affected zones and overall heat input to the bladed pieces to be minimized, which can help reduce or eliminate any deleterious effects on blade alloy strength through the deposition process. During deposition, the metallic sealing material can be actively fed or supplied to the site-of-deposition as, for example, a metallic powder or wire. The metallic sealing material feed may be continually heated to a temperature exceeding the melt or softening point of the metallic sealing material utilizing a laser, an electron beam, or other computer-controlled heat source. The deposition process may be fully automated and carried-out in accordance with a pre-established Computer-Aided Design (CAD) model or other 3D object data. In other embodiments, the deposition process may be performed manually or utilizing semi-automated approach, in which case a pre-existing digital file may not be relied upon during the deposition process.

Figure 5:
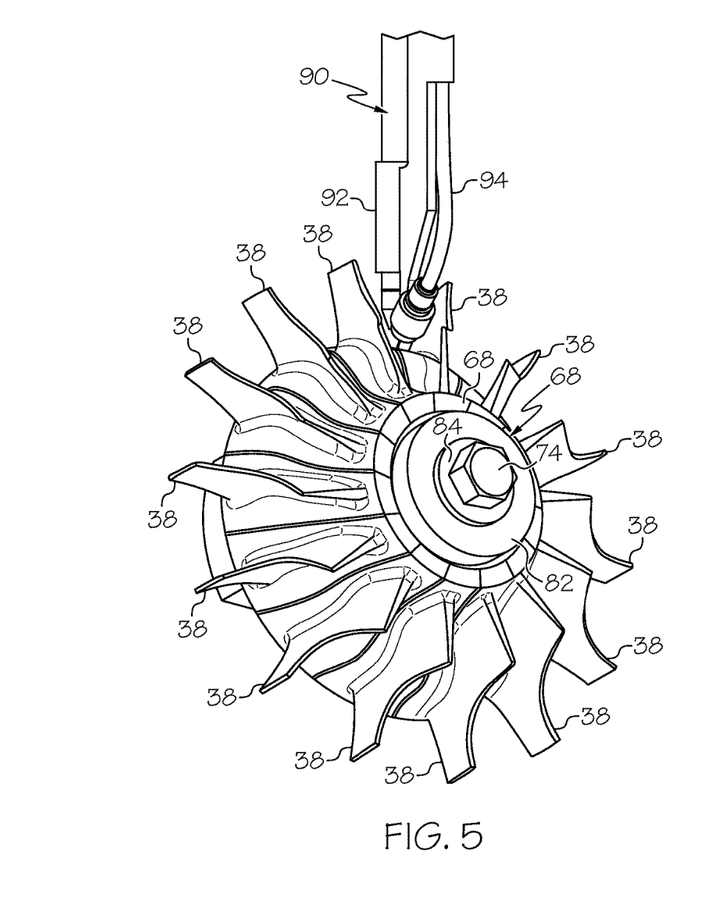
FIGS. 5 and 6 are isometric and detailed isometric views, respectively, of the tooling assembly and bladed pieces shown in FIGS. 3-4 illustrating the deposition of a metallic sealing material between contiguous bladed pieces to produce an annular seal around the ring formation and thereby yield a sealed, sealed ring formation.
Figure 6:
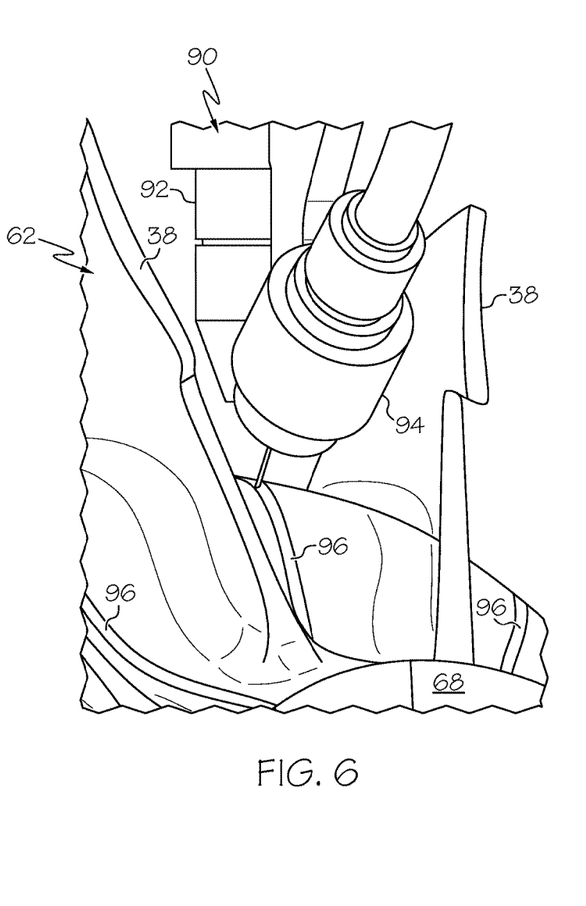
Figure 7:
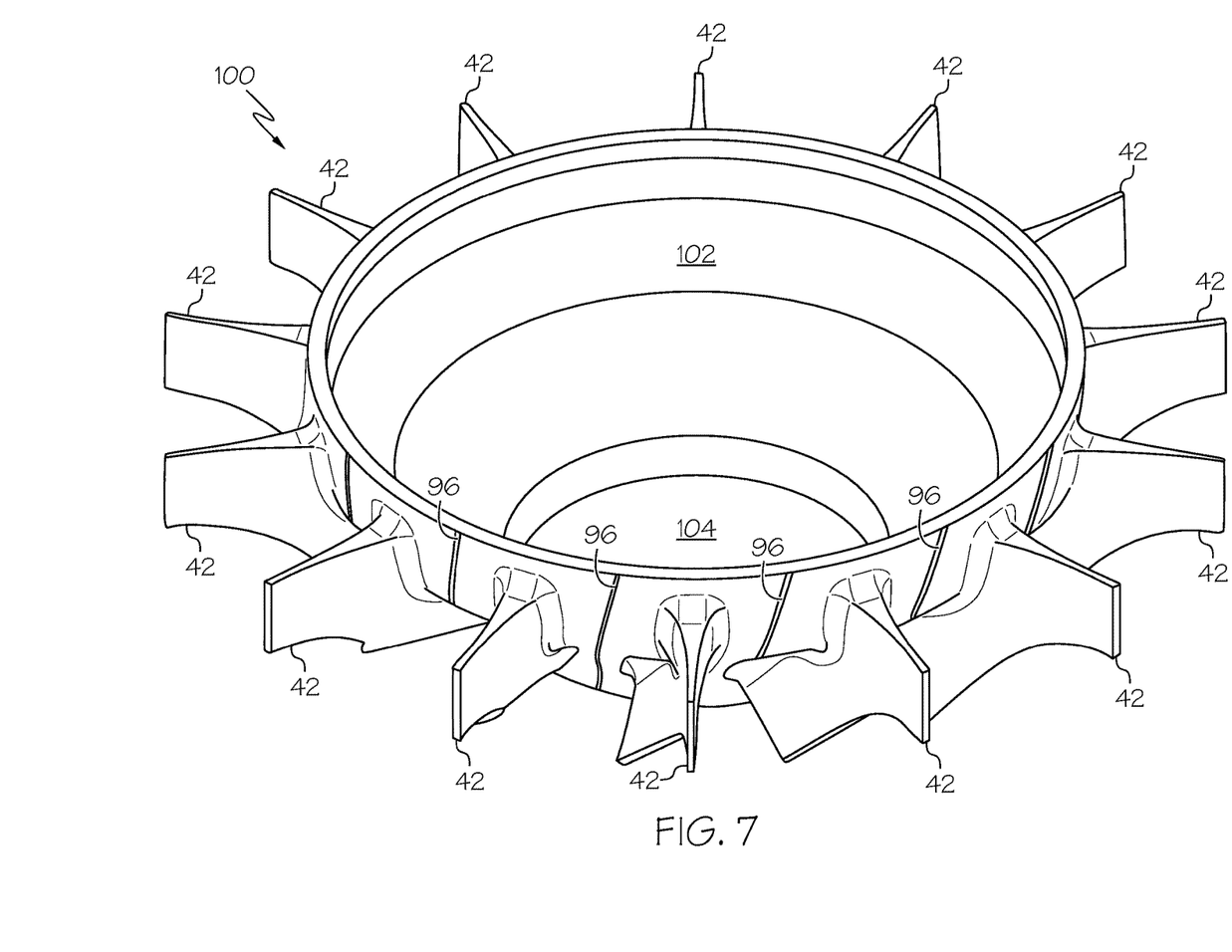
FIG. 7 is an isometric view of the sealed ring formation after machining of the inner circumferential surface thereof and removal from the tooling assembly shown in FIGS. 3-6.

FIGS. 5 and 6 are isometric and detailed isometric views, respectively, of tooling assembly 60 and the bladed pieces 38 shown in FIGS. 3-4 illustrating the deposition of a selected metallic sealing material between contiguous bladed pieces to produce an annular seal around ring formation 62. In this particular example, a laser welding is process carried-out utilizing a computer-controlled laser weld tool 90 having a wire feed head 94 and a laser heat source 92. The metallic sealing material is selectively deposited to produce elongated beads or joints around the outer circumference of ring formation 62 and between contiguous bladed pieces 38. Specifically, the metallic sealing material is deposited at the outer edges of the shank-to-shank bonding interfaces and along flow path junctures 72, which extend across ring formation 62 in fore-aft directions. The resulting flow path joints or alloy-filled joints are identified in FIG. 6 by reference numeral "96"; the term "alloy-filled joint," as appearing herein, encompassing a joint at least partially filled with an alloy or an essentially purse metal. The metallic sealing material can be deposited into the open trenches in sufficient volume to fill the trenches in substantial part or in their entirety. A single pass or multiple passes can be made with laser weld tool 90 to form each alloy-filled joint 96, depending upon the volume of material laid down in each pass of tool 90.

The metallic sealing material utilized to form alloy-filled joints 96 can any material can one or more metals as its primary constituent(s) and amenable to fusion deposition to create a seal between bladed pieces adequate for the below-described HIP process. The metallic sealing material can be a superalloy (e.g., a nickel-based superalloy) or an essentially pure metal, such as nickel. The term "essentially pure metal" is defined herein as a metal that is at least 0.99 percent pure, by weight. It is also desirable for the selected metallic sealing material to have a melt point less than the melt point of the alloy from which bladed pieces 38 are produced (referred to herein as the "blade alloy"). By selecting the metallic sealing material to have a lower melt point than does the blade alloy material, undesired melting and resolidification of the blade alloy can be avoided or at least minimized during the fusion deposition process. It is also desirable for the metallic sealing material to have a relatively high ductility to minimize the formation of cracks and other defects within alloy-filled joints 96 as the metallic sealing material cools, solidifies, and shrinks. In this regard, the metallic sealing material can be selected to have a ductility greater than that of the blade alloy and, perhaps, greater than that of the below-described hub disk alloy. The particular alloy or metal selected for usage as the metallic sealing material will vary amongst embodiments and in relation to the blade alloy. In certain embodiments, the metallic sealing material may be composed of the blade alloy material admixed with one or more melt point suppressants. In further embodiments, a commercially-available superalloy, such as a 600 series INCONEL, can be selected for usage as the metallic sealing material.

The deposition of the metallic sealing material and the resultant formation of alloy-filled joints 96 creates an annular, gas-tight seal around the outer circumference of ring formation 62. The deposited sealing material may also provide a relatively weak mechanical bond between bladed pieces 38 to yield a sealed, sealed ring formation having sufficient structural integrity to allow removal from tooling assembly 60. After removal from tooling assembly 60, the inner surface of sealed ring formation may be machined to bring the sealed ring formation to desired dimensions and to impart the interior of the sealed ring formation with a desired surface finish. In embodiments wherein bladed pieces 38 are further diffusion bonded to a hub disk during the below-described HIP process, machining of the interior surface of the sealed ring formation can help to ensure a close fitting relationship with the hub disk. This may be appreciated more fully by referring to FIG. 7 wherein the sealed ring formation is identified by reference numeral "100." As can be seen, an inner surface 102 of sealed ring formation 100 has been turned or otherwise machined to impart central opening 104 with a desired contour and dimensions, which may correspond with the outer contour and dimensions of a hub disk.

Figure 8:
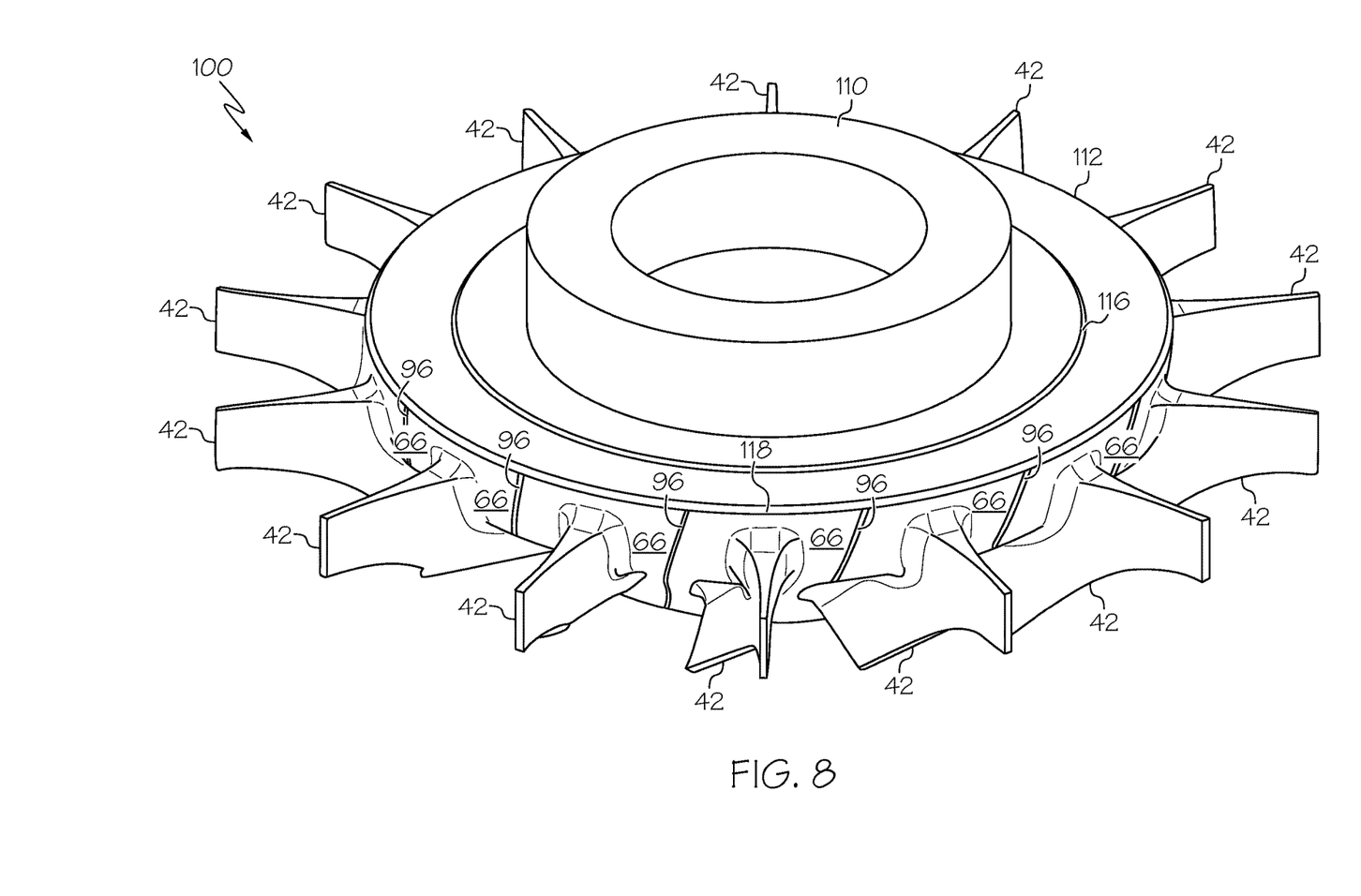
FIGS. 8 and 9 are isometric views of the forward and aft, respectively, of the sealed, sealed ring formation after positioning around a hub disk, which is enclosed by a hermetic cavity defined by the annular seal of the ring formation and axially-opposed diaphragms.
Figure 9:
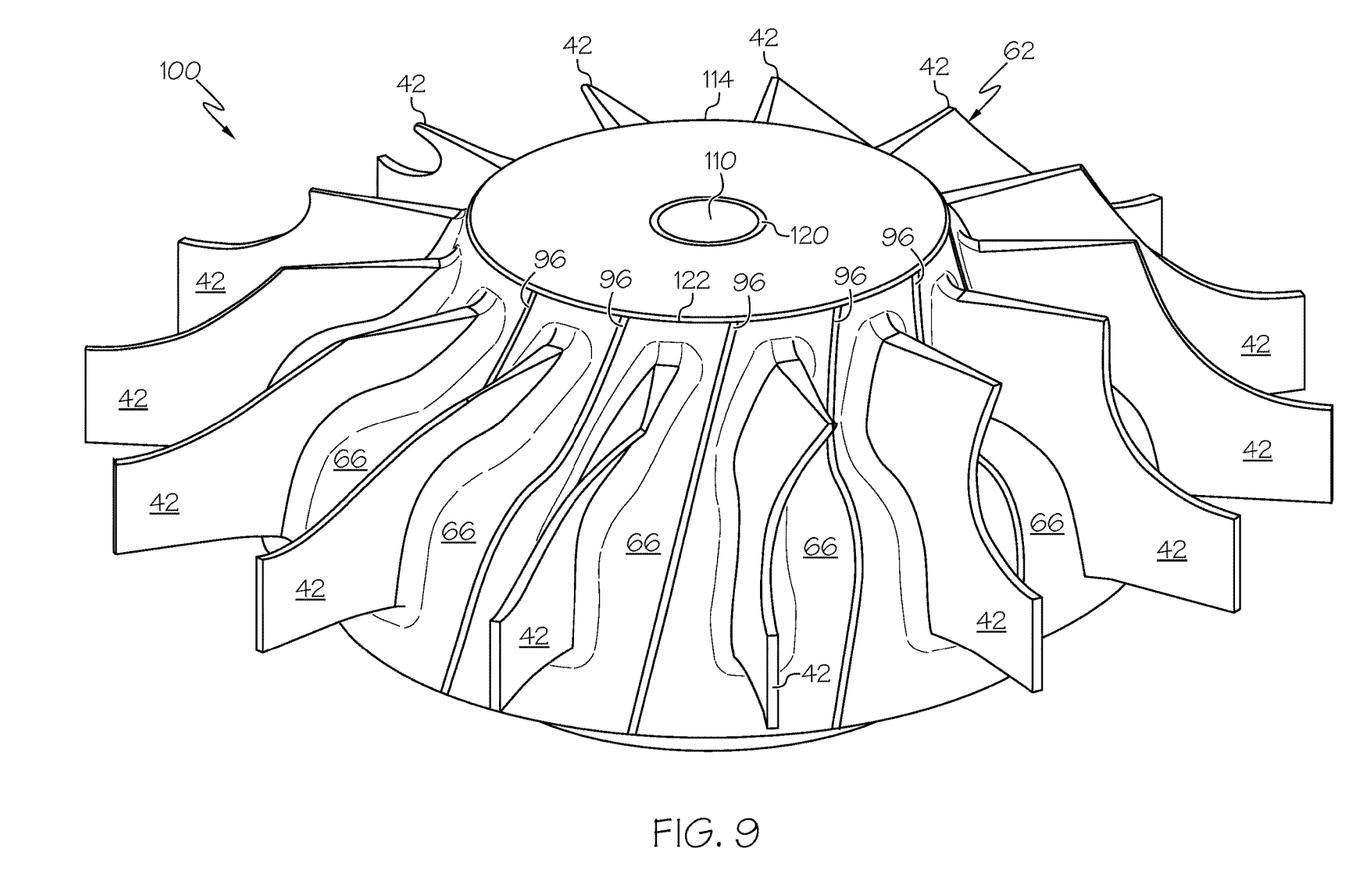

Next, at STEP 30 of exemplary method 18 (FIG. 1), sealed ring formation 100 is positioned around a separately-hub disk. When sealed ring formation 100 is positioned around the hub disk, a shank-to-hub bonding interface is further formed between an outer circumference of hub disk and bladed pieces 38 making-up sealed ring formation 100. FIGS. 8 and 9 are isometric views illustrating sealed ring formation 100 and a hub disk 110 installed within the central opening of sealed ring formation 100. Afterwards, and as indicated in FIG. 1 at STEP 32, a hermetic cavity or enclosure is formed enclosing the interfaces formed between adjacent bladed pieces 38 in sealed ring formation 100 (the "shank-to-shank bonding interfaces") and the interfaces between bladed pieces 38 and hub disk 110 (the "shank-to-hub bonding interface"). This can be accomplished by positioning metal diaphragms over the axially-opposed faces of the hub disk and against the opposing sides of sealed ring formation 100. For example, as further illustrated in FIGS. 8 and 9, first and second metal diaphragms 112 and 114 can be bonded to the opposing faces of hub disk 110 and sealed ring formation 100. Diaphragms 112 and 114 cooperate with the annular seal formed around ring formation 100 to create a hermetic enclosure containing the interfaces formed between adjacent bladed pieces 38 and between bladed pieces 38 and hub disk 110.

With continued reference to FIGS. 8 and 9, different techniques can be utilized to bond the diaphragm edges to sealed ring formation 100 and hub disk 110. In one embodiment, a localized fusion deposition process of the type described above (e.g., a laser or electron beam welding process) can be utilized to create circumferential joints bonding diaphragms 112 and 114 to ring formation 100 and hub disk 110. For example, computer-controlled laser weld tool 90 can again be utilized to create inner and outer circumferential joints 116 and 118, respectively, bonding the outer and inner perimeters of metal diaphragm 112 of hub disk 110 and sealed ring formation 100 (shown in FIG. 8). Similarly, laser weld tool 90 may also be utilized to create inner and outer circumferential joints 120 and 122, respectively, bonding the outer and inner perimeters of metal diaphragm 114, hub disk 110, and sealed ring formation 100 (shown in FIG. 9). After bonding metal diaphragms 112 and 114 to sealed ring formation 100, the resulting hermetic enclosure containing hub disk 110 is evacuated utilizing, for example, vacuum pump and a pinch tube integrated into diaphragm 112 or diaphragm 114 (not shown). A HIP process can then be performed to diffusion bond bladed pieces 38 and hub disk 110 along their respective interfaces.

As noted above, a HIP process may now be performed to diffusion bond bladed pieces 38 and hub disk 110 along their mating interfaces (STEP 32, FIG. 1). During the HIP process, sealed ring formation 100 and hub disk 110 are exposed to elevated temperatures and pressures external to the hermetic cavity sufficient to diffusion bond the shank-to-shank bonding interfaces and the shank-to-hub bonding interface. More specifically, HIP bonding can be performed by placing sealed ring formation 100, hub disk 110, diaphragm 112, and diaphragm 114 within a furnace and subjecting the structure to elevated temperatures and pressures sufficient to create the desired diffusion bond between sealed ring formation 100 and hub disk 110. Afterwards, the structure can be withdrawn from the HIP furnace and metal diaphragms 112 and 114 removed by, for example, machining. After bonding sealed ring formation 100 to hub disk 110, additional processing steps may be performed to complete fabrication of the dual alloy bladed rotor (STEP 34, FIG. 1). Such steps may include further heat treatment steps, the application of a coating or coating system, additional machining to create the more detailed or refined features of the finished bladed rotor, or any combination thereof.

Figure 10:
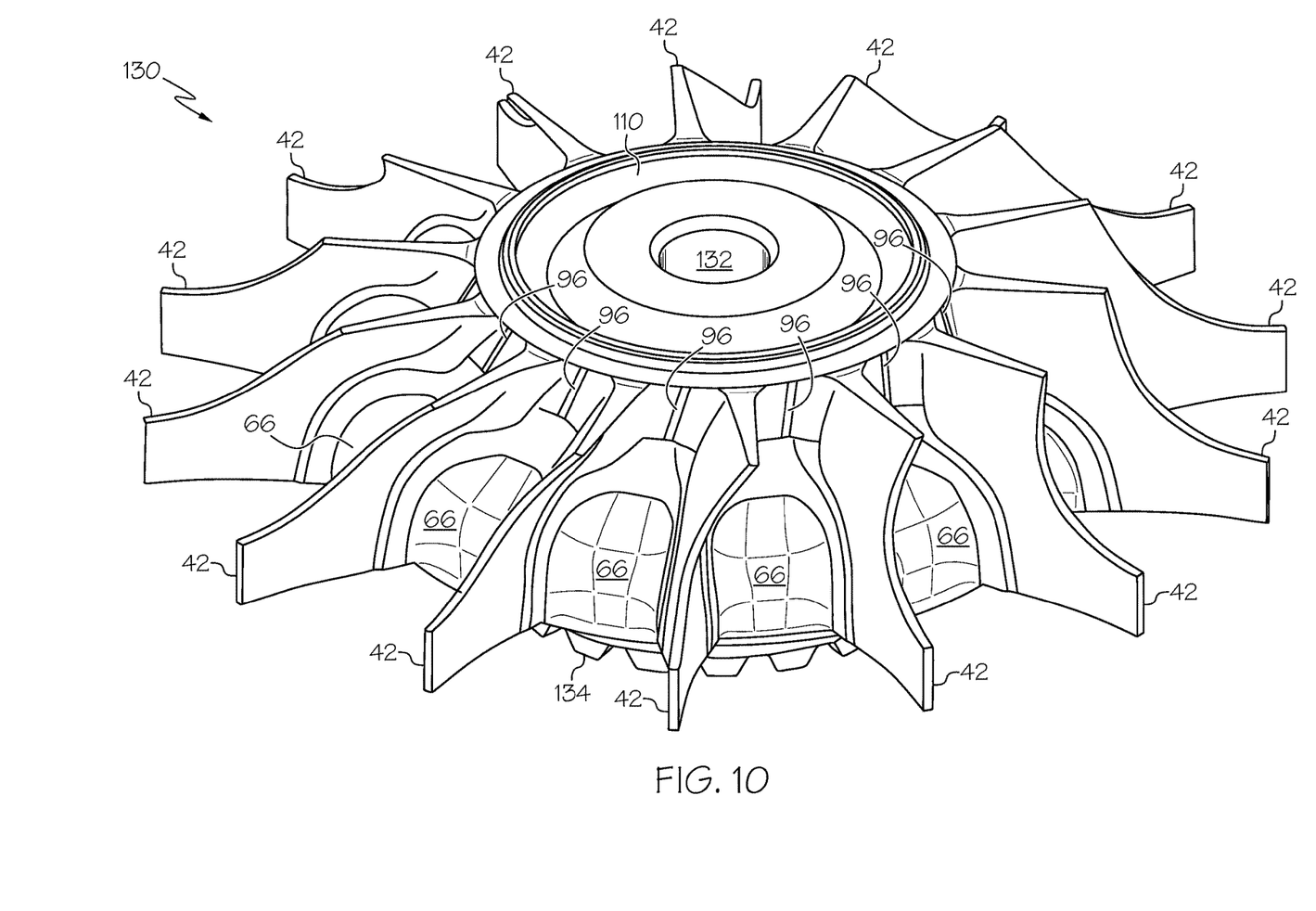
FIG. 10 is an isometric view of the completed dual alloy bladed rotor after diffusion bonding of contiguous bladed pieces along the shank-to-shank bonding interfaces, diffusion bonding of the bladed pieces to the hub disk along the shank-to-hub bonding interface, and final machining of the bladed rotor.

FIG. 10 illustrating a dual alloy bladed rotor 130 in a completed state and produced from hub disk 110 and ring formation 100, which has now been metallurgically consolidated into a blade ring bonded to hub disk 110. As can be seen, additional machining has been performed to impart dual alloy bladed rotor 130 with an axial bore or central channel 132 extending through hub disk 110. Additionally, a castellated or toothed tubular protrusion 134 has been formed on hub disk 110 for the purpose of mating with a corresponding castellated or toothed member when dual alloy bladed rotor 130 is installed within, for example, a gas turbine engine. The outer circumferential regions of bladed rotor 130 defining gas flow paths 66 may also be machined. In this case, alloy-filled joints 96 may be removed in whole or in part. In the exemplary embodiment shown in FIG. 10, for example, alloy-filled joints 96 have been partially removed due to machining of upstream portions of gas flow paths 66. In further embodiments, alloy-filled joints 96 may be removed in their entirety during the post-HIP machining. Alternatively, alloy-filled joints 96 may be left intact even when protruding radially outward from the surfaces defining gas flow paths 66 as joints 96 will typically be orientated in the general direction of gas flow and therefore have little aerodynamic impact or penalty on bladed rotor 130 during operational thereof. In still further embodiments, dual alloy bladed rotor 130 may be machined to include various other structural additional features, such as stress relief slots radially extending into the body of rotor 130 at locations between blades 42.

The foregoing has provided embodiments of a manufacturing process for producing a dual alloy bladed rotor including a hub disk and rotor blades fabricated from different alloys tailored to their unique operating environments. During the above-described manufacturing process, bladed pieces are arranged in a ring formation, and a metallic sealing material is deposited between contiguous bladed pieces to produce an outer circumferential seal around the ring formation. The metallic sealing material is advantageously deposited utilizing a computer-controlled localized fusion deposition process, such as laser or electron beam welding, to precisely regulate the heat input to the rotor blades and better preserve blade alloy strength. A HIP process is then carried-out to diffusion bond the bladed pieces along their mating interfaces and, perhaps, to further diffusion bond the bladed pieces to a hub disk. By virtue of such a manufacturing process, the hub disk can be fabricated from a first alloy (e.g., an equiax superalloy) having high mechanical strength at operational temperatures, while the rotor blades are produced from a second alloy (e.g., a single crystal or directionally-solidified superalloy) providing good mechanical strength and oxidation resistance under high temperature conditions. As compared to other manufacturing processes enabling an outer blade ring to be joined to a hub disk, the above-described manufacturing process can reduce the cost and complexity of rotor manufacture, minimizes leakage across the turbine rotor, and allows a decrease in the overall size and weight of the turbine rotor.

While multiple exemplary embodiments have been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended Claims.

What is claimed is:

1. A method for manufacturing a bladed rotor, the method comprising:
    arranging bladed pieces in a ring formation such that contiguous bladed pieces contact along shank-to-shank bonding interfaces, the bladed pieces having chamfered edges combining to form trenches at the interfaces between adjacent bladed pieces when arranged in the ring formation;
    positioning the ring formation around a hub disk having an outer circumferential surface contacted by the bladed pieces along a shank-to-hub bonding interface;
    before or after positioning the ring formation around the hub disk, utilizing a computer-controlled fusion deposition process to deposit a metallic sealing material into the trenches in sufficient volume to substantially fill the trenches and produce alloy-filled joints forming an annular seal around the ring formation;
    forming a hermetic enclosure circumferentially bounded by the annular seal and enclosing the shank-to-shank bonding interfaces and the shank-to-hub bonding interface; and
    performing a Hot Isostatic Pressing (HIP) process during which the ring formation and the hub disk are exposed to elevated temperatures and pressures external to the hermetic enclosure sufficient to diffusion bond the shank-to-shank bonding interfaces and the shank-to-hub bonding interface.

2. The method of claim 1 wherein contiguous bladed pieces combine to form flow path junctures when the bladed pieces are arranged in the ring formation, and wherein depositing comprises depositing the metallic sealing material along the flow path junctures.

3. The method of claim 2 further comprising machining the flow path junctures such that the deposited metallic sealing material is at least partially removed after performing the HIP process.

4. The method of claim 1 wherein, during the computer-controlled fusion deposition process, the alloy-filled joints are gradually built-up around the ring formation in accordance with pre-established three dimensional object data.

5. The method of claim 4 wherein the computer-controlled fusion deposition process comprises one of the group consisting of laser welding and electron beam welding.

6. The method of claim 4 wherein the bladed pieces are composed of a blade alloy, and wherein the method further comprises selecting the metallic sealing material to have a ductility greater than the ductility of the blade alloy.

7. The method of claim 4 further comprising loading the bladed pieces into a tooling assembly maintaining the bladed pieces in the ring formation, while leaving the outer circumferential surface of the ring formation uncovered for tooling access during deposition of the metallic sealing material.

8. The method of claim 7 wherein the tooling assembly applies a clamping force on the bladed pieces in axial and radially inward directions to maintain the bladed pieces in an arch bound state during deposition of the metallic sealing material.

9. The method of claim 1 wherein the bladed pieces are cast to include shank sidewall surfaces, which contact when the bladed pieces are arranged in the ring formation.

10. The method of claim 9 wherein the bladed pieces are cast from a single crystal superalloy, and wherein the method further comprises applying or plating a grain boundary strengthen layer onto the shank sidewalls prior to arranging the bladed pieces in the ring formation.

11. The method of claim 1 wherein providing a hermetic enclosure comprises sealingly attaching first and second diaphragms to the bladed pieces and the hub disk to enclose the shank-to-hub bonding interface within the hermetic enclosure.

12. A method for manufacturing a bladed rotor, the method comprising:
    arranging bladed pieces in a ring formation having flow path junctures, which are formed between contiguous bladed pieces and which extend at least partially across an outer circumferential surface of the ring formation;

utilizing a computer-controlled fusion deposition process to deposit a metallic sealing material along the flow path junctures to form an annular seal around the outer circumferential surface of the ring formation;

positioning the ring formation around a hub disk having an outer circumferential surface contacted by the bladed pieces along a shank-to-hub bonding interface;

after positioning the ring formation around the hub disk, placing diaphragms against opposing sides of the ring formation and the hub disk;

further utilizing the computer-controlled deposition process to form circumferential joints around the diaphragms, the circumferential joints bonding the diaphragms to the ring formation and the hub disk to hermitically enclose the shank-to-hub bonding interface; and performing a Hot Isostatic Pressing (HIP) process during which the ring formation and hub disk are exposed to elevated temperatures and pressures sufficient to create a diffusion bond between the hub disk and the ring formation, while also creating diffusion bonds between contiguous bladed pieces in the ring formation.

13. The method of claim 12 wherein the bladed pieces are composed of a blade alloy, wherein the hub disk is fabricated from a hub disk alloy different than the blade alloy, and wherein the method further comprises formulating the metallic sealing material to be composed of the blade alloy material admixed with one or more melt point suppressants.

* * * * *